United States Patent [19]
Gold

[11] Patent Number: 4,776,132
[45] Date of Patent: Oct. 11, 1988

[54] MOUNTING FOR AN AUTOMOBILE GLASS WINDOW

[76] Inventor: Peter Gold, 465 N. Wood Rd., Rockville Centre, N.Y. 11570

[21] Appl. No.: 104,237

[22] Filed: Oct. 5, 1987

[51] Int. Cl.$^4$ .............................................. E05F 11/38
[52] U.S. Cl. ........................................ 49/375; 49/374
[58] Field of Search ................. 49/374, 375, 350, 351, 49/363, 349; 16/200

[56] References Cited

U.S. PATENT DOCUMENTS

| | | | |
|---|---|---|---|
| 2,326,532 | 8/1943 | Graebner | 49/375 |
| 2,494,040 | 1/1950 | Floraday | 49/375 |
| 2,807,462 | 9/1957 | Rothang | 49/351 |
| 3,816,962 | 6/1974 | Ladd et al. | 49/351 |
| 4,662,113 | 5/1987 | Weaver | 49/374 |

FOREIGN PATENT DOCUMENTS

| | | | |
|---|---|---|---|
| 357571 | 3/1938 | Italy | 49/501 |
| 0036566 | 9/1984 | Japan | 49/350 |
| 0092116 | 5/1985 | Japan | 49/376 |

Primary Examiner—Kenneth J. Dorner
Assistant Examiner—Gerald A. Anderson
Attorney, Agent, or Firm—Myron Amer

[57] ABSTRACT

In the assembly of an auto glass window to the mounting bracket portion of the operator which raises and lowers the window, the improvements which consist of notches in opposite corners of the glass window bottom edge and cooperating tabs on the mounting bracket which bend forward over gripping surfaces formed by the notches, and thus engage the glass window more firmly than the prior art adhesive engagement, thereby obviating the loosening of the glass window particularly during descending movement thereof against the friction of the window tracking guides.

3 Claims, 1 Drawing Sheet

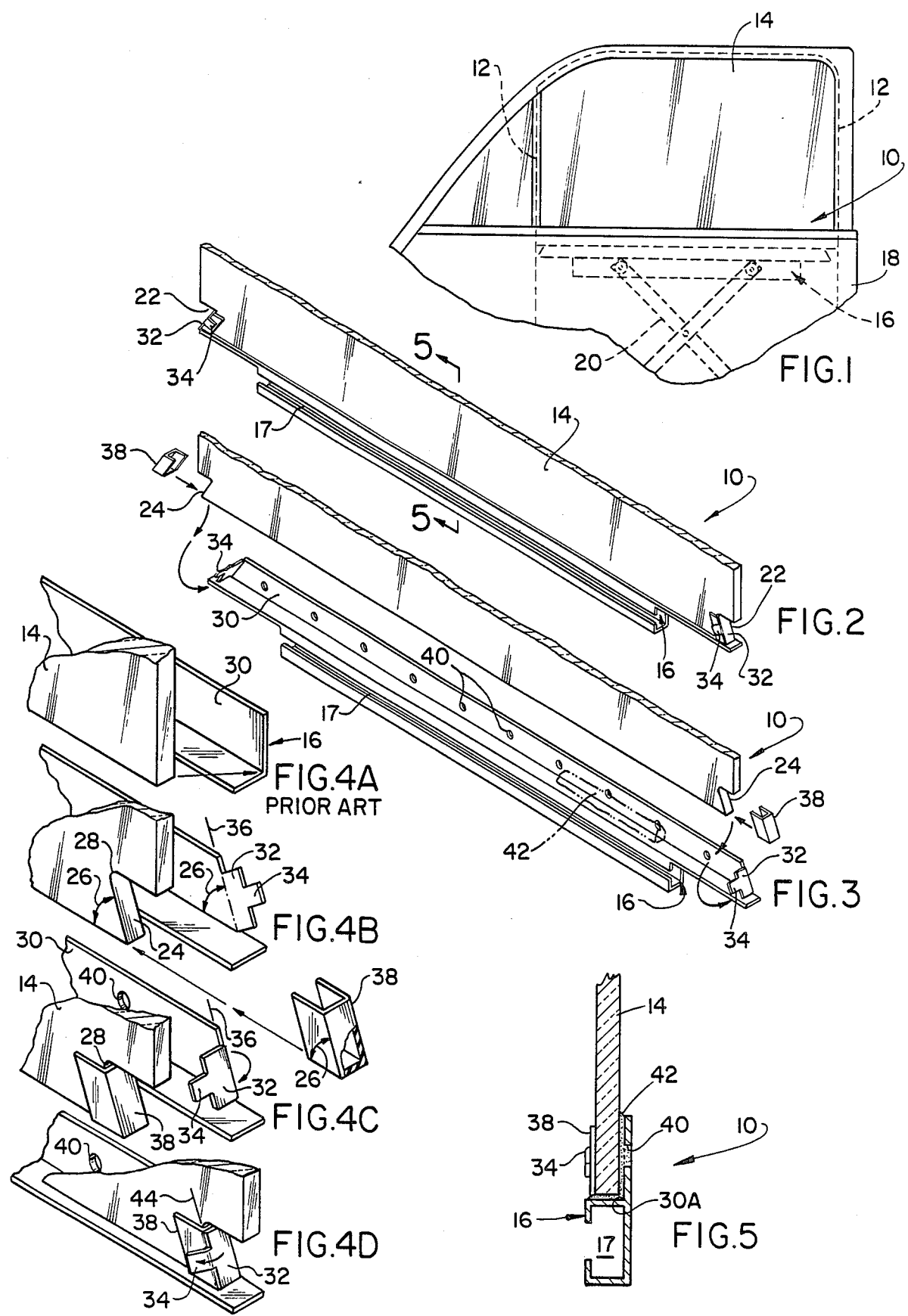

MOUNTING FOR AN AUTOMOBILE GLASS WINDOW

The present invention relates generally to a window assembly for an automobile, one component of which is safety glass and the other component a mounting bracket for the bottom of the glass, which assembly is actuated by an operator to raise and lower the glass or window in relation to a window opening in the automobile or car door.

PRIOR ART

The most popular automobile window assemblies of this character are those which mount the safety glass window to the support bracket of the operator with an elastomeric molded part interposed between the lower edge of the window and the support bracket. However, the elastomeric part which is attached to the lower edge of the glass window is relatively costly, since, as above noted, it has to be molded and the assembly thereof to the lower edge is time consuming, which also increases the cost of installation. Also, although an adhesive is usually used to attach the elastomeric member to the bottom edge of the glass and then to adhesively secure the elastomeric part to the support brcket, the constant raising, and particularly lowering of the window against the frictional force of the tracking guideways, often causes a delamination of the adhesive and inadvertent disengagement of the window from the support bracket.

EXAMPLE OF PRIOR ART

U.S. Pat. No. 4,662,113 issued on May 5, 1987 to Weaver describes a typical attachment of a safety glass automobile window to a support bracket wherein the lower edge of the safety glass is seated in an L-shaped portion of the bracket and a gasket, of elastomeric or similar material, is molded in situ simultaneously to the lower edge of the window and to the bracket. Thus, instead of the gasket being molded at a remote location and then being fitted and adhesively secured in place along the lower edge of the glass window, Weaver has facilitated and simplified the procedure by having the gasket molded in situ. Nevertheless, the firmness by which the glass is attached to the mounting bracket is still dependent mainly upon the adhesive and the ability, therefore, to prevent delamination of the adhesive, which is difficult to prevent because of the frictional force in the tracking guideways which resists downward movement of the glass window when it is "pulled" into its open position. Complicating the problem is the fact that so-called "safety glass", which is universally employed in the windshields and windows of automobiles, is made by laminating a sheet of transparent plastic between two sheets of plate glass. When safety glass is broken, it does not shatter like ordinary glass, even under the impact of a hard blow. Instead, the broken pieces of glass are held in place by the adhesive plastic layer between them, which usually is cellulose nitrate. Unfortunately, achieving a shatterproof construction is at the cost of rendering the glass, when it is safety glass, with extreme brittleness due to the lamination and plastic content, and this brittleness has complicated the problem of attaching the lower edge of the glass to any metal or plastic support bracket.

It is desirable, therefore, to provide, with less cost and less handling, a safety glass automobile window which is firmly attached to the mounting bracket of a follower track of a door operator, wherein the firmness of the attachment is not dependent solely or primarily on obviating any delamination in the adhesive used in connecting these two components. More particularly, whether it be for factory installation or for repairshop window replacement in vehicles, the present invention relates to attachment of a support bracket of a follower track to a safety glass window in which effective means are employed to shape both glass and track support bracket to form a positive, long lasting, easily made connection between the glass and the track bracket. As will be explained in detail subsequently, the outboard, lower corners of the glass are undercut at an angle and mating locking tabs are formed on the follower track bracket. In a preferred embodiment, buffers are used to eliminate glass to metal stress that may occur at assembly or as a result of thermal forces. A semi-rigid adhesive is used to dampen vibration and generally reinforce the joint.

In use, and thus when the assembly is installed in the door and an operator mechanism reacts on the follower channel or track to raise or lower same, a noteworthy aspect of the present invention is that one of the referred to "primary" tabs bear most of the forces of the operator mechanism while another "secondary" pair of tabs retain the glass within the follower channel, and thus significantly supplement the adhesive attachment of the glass to the follower channel.

The description of the invention which follows, together with the accompanying drawings, should not be construed as limiting the invention to the example shown and described, because those skilled in the art to which this invention appertains will be able to devise other forms thereof within the ambit of the appended claims.

FIG. 1 is a partial elevational side view of a car door showing the inventive window assembly hereof in closed position and the drive linkage in hidden broken lines;

FIG. 2 is a partial perspective view of the components of said assembly, namely the window and the tracking mounting bracket for the window;

FIG. 3 is an exploded perspective view showing further details of the window and the track mounting bracket;

Figs. 4A-D, respectively, are all partial perspective views illustrating the manner in which the car window is attached to a track mounting bracket. More particularly, FIG. 4A illustrates how the window is typically attached to the track mounting bracket according to the prior art;

Figs. 4B-4D illustrate, in contract to FIG. 4A, the steps, in sequence, in which the window is attached to the track mounting bracket in accordance with the present invention; and FIG. 5 is a cross sectional view, taken along with line 5—5 of FIG. 2, showing further structural details.

As shown in FIG. 1, the components of an assembly 10 consists of a safety glass panel 14 connected to a follower track 16 fitted to slide up and down in spaced apart guideway 12 along opposite sides of a vehicle door 18. As is already well understood, follower track 16, made integral with follower channel 17 (FIG. 2) and angle member 30 (FIG. 3) is put in vertical motion by linkage 20 which is usually of the scissor type construction and has rollers at the ends of its arms which operate in the shaped track 16. Linkage 20 can be controlled by a hand crank or power unit, neither of which are part of the invention and are, therefore, not shown.

The within inventive assembly of window and track mounting brcket is shown in FIGS. 2 and 3, and the steps according to which these components are assembled are shown in FIGS. 4B–D, to which figures reference will soon be made. It is believed helpful, however, to first refer to FIG. 4A which illustrates a typical prior art assembly of an automobile window and track mounting bracket. In FIG. 4A is shown in spaced relation, the conventional square cornered glass 14 and a straight flanged angle member 30 of track 16, usually clamped, cemented or otherwise connected together.

In contrast to what is illustrated in FIG. 4A, the inventive window assembly includes structural features now to be described in connection with FIGS. 2, 3 and the assembly steps of FIGS. 4B–D. As shown in these figures, and more particularly in FIG. 4B, an undercut 24 is made to both corners of glass 14 to provide a positive gripping surface. In this connection, it is important to note that because of the brittle characteristic of safety glass, it has, heretofore, been impractical to provide a "positive" mechanical grip on the glass by machining. Conventional means, such as sawing, drilling and grinding of the glass, bring about the intrinsic result of widespread cracking. Recent advances, however, in cutting technology such as described in the literature of Flow Systems, of Kent, Wash., now allow for the cutting of glass with a minimum of or no flex, shock, heat generation, vibration or delamination. The described cutting technique uses water under high pressure and having an abrasive material content. The cutting technology referred to is well known to those versed in the art and is not a part of the invention other than that it is available and recommended for use in producing the undercuts 24.

Continuing with the description, it is to be noted that angle 26 of each undercut 24 is approximately thirty degrees and that the vertical height of the cut is made high enough to provide for a stress reducing radius at the inside corner, as at 28.

With respect to the construction of the ends of the angle member 30 of the follower track 16, which construction is the crux of the within invention, said opposite ends are to be provided, by conventional die stamping or other methods, with a pair of primary locking tabs 32 and pair of secondary locking tabs 34. As shown more particularly in FIG. 4C, each tab 34 is formed by a bend of ninety degrees forward about an axis 36. At this point in the assembly, snug fitting buffer caps 38, mdde of hard rubber or plastic, are installed on each of the undercut corners 24, as shown in FIGS. 4B and 4C.

In addition to forming locking tabs 32 and 34, an array of anchor holes 40 is machined in the vertical wall of angle member 30 as shown in FIG. 3. Before final assembly is made, a bead of adhesive sealant 42, such as polyurethane sealant, commercially available from Mobay Chemical Corp. of Pittsburgh, Pa., is spread along angle member 30.

As shown in FIG. 4D and FIG. 5, with the adhesive bead 42 in place on angle member 30, the glass 14, with undercuts 24, is positioned between the spaced apart tabs 32 and pressed towards the vertical member of angle 30 so as to establish complete adhesive contact of the bead 42 with all parts. At this point in the assembly, each of the tabs 34 are then bent ninety degrees inward, as shown in FIG. 4D, about the axis 22. Any excess sealant 42 may be troweled away and, if necessary, cleaned with a solvent.

When assembly 10 is finally installed in door 18 and mechanism 20 reacts on follower channel 17, all in a well understood manner, it should be readily appreciated that the additional interconnecting structural features of the window and mounting bracket according to the present invention, and consisting primarily of the tabs 32, bear most of the forces of the mechanism 20, while the second tabs 34 function effectively to retain the glass 14 within the angle member 30. Also effective in retaining the attachment of the glass 14 to the angle member 30 is, of course, the adhesive 42 at the interface of the bottom edge of the glass 14 and the L-shape or corner 30A of the angle member 30, as well as the curing of the adhesive 42.

While the particular assembly of car window and tacking bracket herein shown and disclosed in detail is fully capable of attaining the objects and providing the advantages hereinbefore stated, it is to be understood that it is merely illustrative of the presently preffered embodiment of the invention and that no limitations are intended to the detail of construction or design herein shown other than as defined in the appended claims.

Another noteworthy aspect of the invention is that because of the use the tabs, it is unnecessary that there be any hole-drilling in the glass. That is, hole-drilling in glass is known to create a weak spot therein which is usually the primary cause of fracturing of glass especially in shock situations, such as vehicle accidents, and can occur even in normal usage.

What is claimed is:

1. An improved mounitng for raising and lowering a glass window into and out of an automobile window opening comprising in combination with said glass window having a bottom edge thereon at a pair of notches each in an opposite corner of said glass window bottom edge so as to provide an upwardly and inwardly first surface oriented at a selected angle to the horizontal, and a window mounting bracket connecting said window to window operating means and consisting of a vertical and horizontal pair of leg members in an L-shape configuration defining a shoulder for receiving said window bottom edge, each opposite corner of said bracket vertical leg member having a notch therein so as to provide an upwardly and inwardly second surface oriented at the same selected angle to the horizontal as said first surface, and tab means extending perpendicularly of said second surface so that when said glass window is seated in said shoulder of said bracket with said first and second angled surfaces in adJacent relation said tab means are adapted to be bent in engaged relation forwardly about said window first surface, to thereby contribute to firmly interconnecting said glass window and said mounting bracket.

2. An improved mounting for an automobile glass window as claimed in claim 1 wherein said tab means is of an appropriate length to bend a first portion thereof firstly over said glass window first surface and to bend an adJacent second portion thereof against a front surface of said glass window, whereby said tab means first bent portion grips said glass window during descending movement of said mounting bracket and said tab means second bent portion holds said glass window within said shoulder of said mounting bracket.

3. An improved mounting for an automobile glass window as claimed in claim 2 wherein said vertical leg member of said mounting bracket is provided with spaced openings therealong, and including an adhesive applied along said glass window bottom edge to adhesively hold said edge to said mounting bracket and flowing into said spaced openings, to supplement the adhesive engagement established between said glass window and said mounting bracket.

* * * * *